United States Patent [19]

Feigel et al.

[11] Patent Number: 4,900,968
[45] Date of Patent: Feb. 13, 1990

[54] ELECTRONICALLY COMMUTATED COLLECTORLESS DIRECT-CURRENT MOTOR

[75] Inventors: Josef Feigel, Landshut; Klaus Pfendler, Bonndorf, both of Fed. Rep. of Germany

[73] Assignee: Standard Elektrik Lorenz Aktiengesellshaft, Stuttgart, Fed. Rep. of Germany

[21] Appl. No.: 175,497

[22] Filed: Mar. 30, 1988

[30] Foreign Application Priority Data

Mar. 31, 1987 [DE] Fed. Rep. of Germany ....... 3710659

[51] Int. Cl.[4] .............................................. H02K 3/46
[52] U.S. Cl. ..................................... 310/260; 310/43; 310/68 R; 310/71; 310/194; 310/DIG. 6
[58] Field of Search ...................... 310/260, 42, 43, 46, 310/68 R, 68 B, 71, 156, 179, 180, 184, 208, 194, 214, 254, 258, 89, 181, DIG. 6; 318/254

[56] References Cited

U.S. PATENT DOCUMENTS

| | | | |
|---|---|---|---|
| 3,644,765 | 2/1972 | Janson | 318/254 A |
| 4,529,900 | 7/1985 | Uzuka | 310/43 |
| 4,656,378 | 4/1987 | Atherton | 310/71 |
| 4,682,065 | 7/1987 | English | 310/89 |
| 4,728,836 | 3/1988 | Wrobel | 310/89 |

FOREIGN PATENT DOCUMENTS 3438747 4/1986 Fed. Rep. of Germany .

Primary Examiner—R. Skudy
Attorney, Agent, or Firm—Spencer & Frank

[57] ABSTRACT

An electrically commutated, collectorless direct-current motor is disclosed whose stator has a self-supporting drum winding and a cylindrical plastic body which is located concentrically with the drum winding in a winding head. The cylindrical plastic body has recesses which contain eyehooks. The ends of the drum winding are connected with the eyehooks, which are welded to a circuit board. The invention makes it possible to automate the connection of the winding ends to the circuit board.

10 Claims, 2 Drawing Sheets

ELECTRONICALLY COMMUTATED COLLECTORLESS DIRECT-CURRENT MOTOR

BACKGROUND OF THE INVENTION

1. Technical Field

The present invention pertains to an electronically commutated, collectorless direct-current motor.

2. Background Art

Such a direct-current motor is known from DE-OS 34 38 747. The stator winding of the known electronically commutated, collectorless direct-current motor comprises an insulating body which consists of a disk-shaped ring and a plurality of axially extending slotted portions annularly arranged thereon. The slotted portions are supported by a tubular section. The individual phase windings of the stator winding are located outside the slotted portions, the ends of the windings being connected to a circuit board. The ends are commonly soldered directly to the circuit board.

The disadvantage of the known direct-current motor is that during production, the ends of the winding must be soldered to the circuit board by hand.

SUMMARY OF THE INVENTION

It is the object of the present invention to provide an electronically commutated, collectorless direct-current motor which can be produced in a more cost-effective manner.

This object is achieved in a direct-current motor of the above kind in which ends of the stator coil are secured to eyehooks which are connected with a cylindrical plastic body. The plastic body is concentric with the stator coil, and has a front end having a rim. The rim has a plurality of recesses which contain the eyehooks.

BRIEF DESCRIPTION OF THE DRAWINGS

An embodiment of the invention will now be described with reference to the accompanying drawings, in which.

DESCRIPTION OF THE PREFERRED EMBODIMENT

Figure 1:
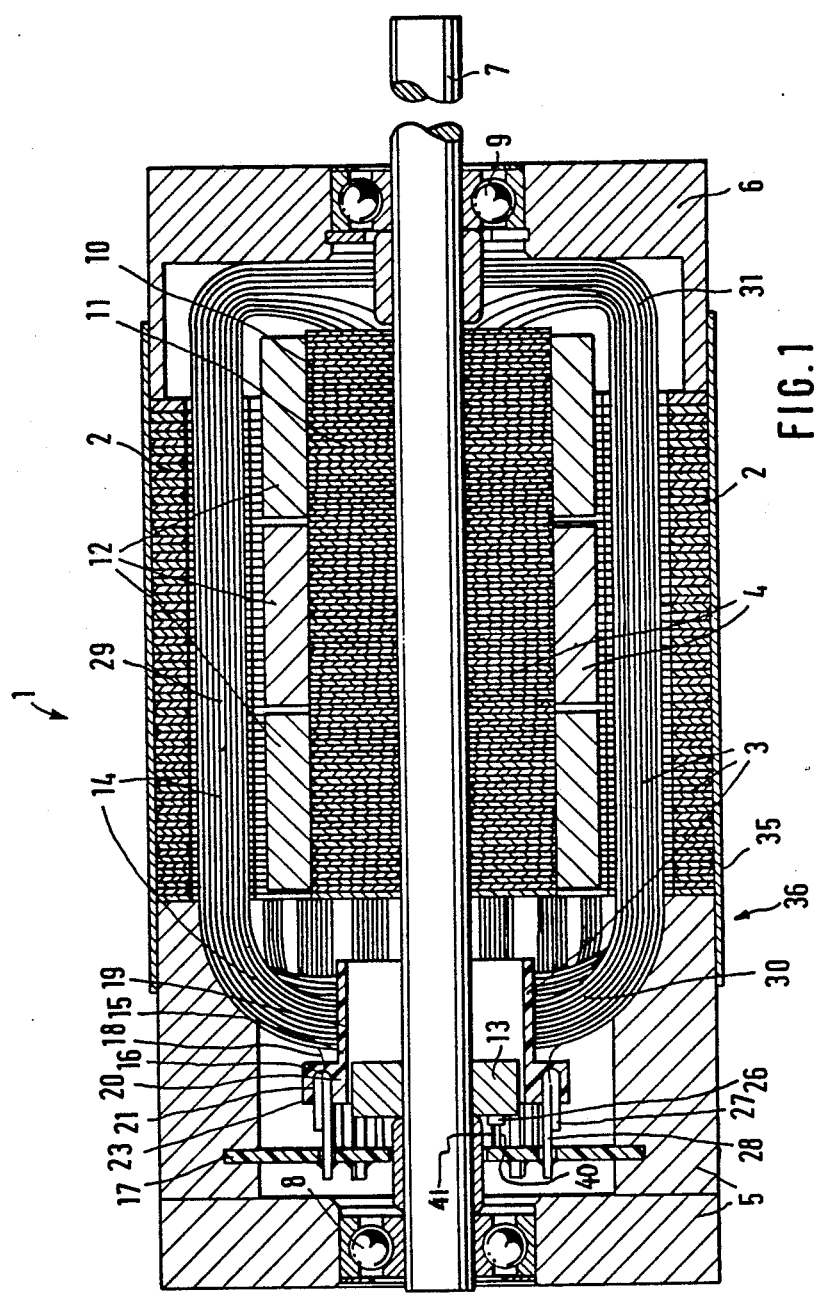
FIG. 1 is a longitudinal section of an embodiment of the electronically commutated, collectorless direct-current motor in accordance with the invention.

An electronically commutated, collectorless direct-current motor 1 in accordance with the invention is shown in FIG. 1. It comprises an external magnetic yoke 2, a stator 3, a multipolar rotor 4, and two end shields 5, 6. Together with an outer casing 35, the two end shields 5, 6 form a frame 36 of the direct-current motor 1.

A shaft 7 of the rotor 4 is connected with the end shields 5, 6 via two bearings 8, 9. The rotor 4 comprises a steel cylinder or a cylinder 11 built up of laminations 10 supporting a multipolar magnetic system 12 which consists of several annular magnets subdivided in the axial direction, or of embedded magnetic bars. Furthermore, a bipolar annular magnet 13 is located on the shaft 7 to permit position determination. The cylinder 11 consisting of the laminations 10 serves as an internal magnetic yoke.

Figures 2, 3, 4:
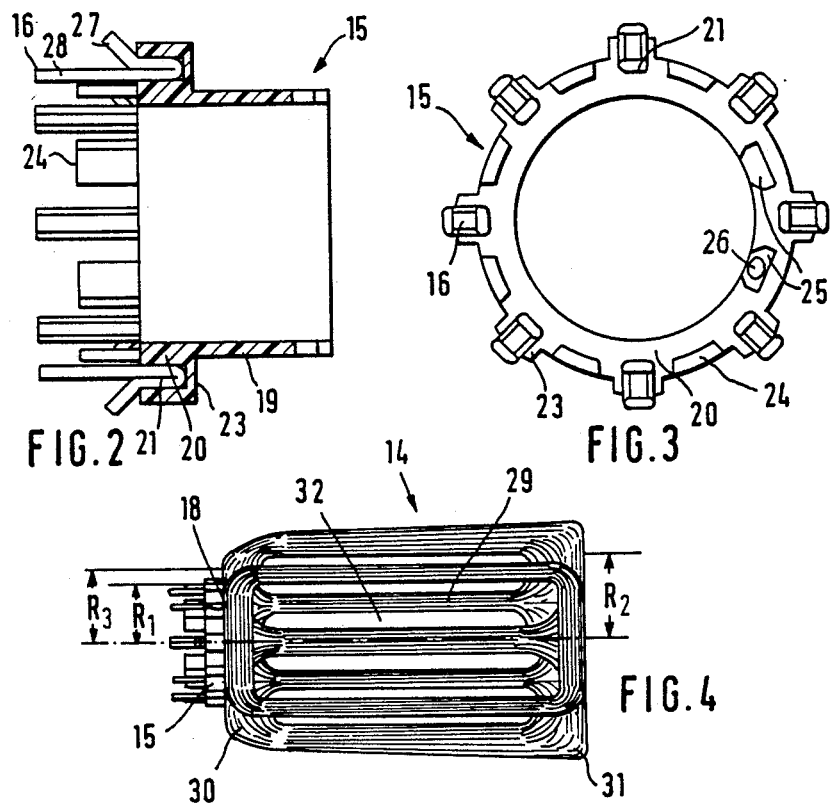
FIG. 2 is a section of a plastic body with eyehooks.
FIG. 3 is an end view of the plastic body of FIG. 2.
FIG. 4 is a side view of the stator coil with the plastic body and the eyehooks.

The stator 3 consists of a multipolar stator coil 14, a plastic body 15, several eyehooks 16, and a circuit board 17. The stator coil 14 has a number of phase windings 29 which are equal to a multiple of the number of poles and which are wound to form a ring circuit. The plastic body 15 is shown in FIGS. 2 and 3. It consists of a hollow cylinder 19 with a rim 20 which is provided on the front end. The rim 20 has a number of recesses 21 equal to the number of phase windings and which contain the eyehooks 16. The hollow cylinder 19 and the rim 20 are of one-piece construction and have an inner cylindrical surface. However, the outside diameter of the rim 20 exceeds that of the hollow cylinder 19. In addition, in the area of the recesses 21, the rim 20 has outer projections 23. Arranged at the front end of the rim 20 between the recesses 21 are pin-shaped spacers 24. Slots 25 for receiving Hall-effect sensors 26 are located in two areas between two pairs of recesses 21 instead of the spacers 24. In these slots 25, the Hall-effect sensors 26 are protected against shock and require no adjustment.

Each end 18 of the stator coil 14 is brought along about half the circumference of the hollow cylinder 19, then around the projections 23, through the eyehooks 16 and again along about half the circumference of the hollow cylinder in such a manner that the plastic body 15 is surrounded by the end 18 of the stator coil, thus being fixed in position. Each of the ends 18 of the stator coil are welded to a corresponding one of the eyehooks 16.

Each eyehook 16 is U-shaped and consists of two legs 27, 28 of different lengths. When the eyehooks 16 are arranged in the rim 20, the shorter leg 27 is bent outside the recess 21, thus forming a hook. After the corresponding end 18 of the stator coil has been brought between the legs 27 and 28, the shorter leg 27 is bent towards the longer leg 28 and welded. The longer leg 28 of the eyehook 16 forms a pin for connection to an electrical socket, and extends beyond the spacers 24 by about 4 mm, so that it can be inserted into the circuit board 17 and soldered. The shorter leg 27 primarily serves to fix the ends 18 of the stator coil within the eyehook 16 and does not extend beyond the spacers 24.

The stator coil 14 ends 18 of the are firmly soldered to the circuit board 17 via the eyehooks 16, with the circuit board 17 resting against the spacers 24. Furthermore, the Hall-effect sensors 26 disposed in the slots 25 are electrically connected to the circuit board 17 via wires 40 and 41 (shown in FIG. 1) which are soldered to the circuit board 17. In addition, other elements are located on the circuit board 17. Thus, for example, several connectors which are electrically connected to the corresponding eyehooks 16 are soldered to the circuit board 17 so as to protrude from the frame 36 and are accessible from the outside. The circuit board 17, on the other hand, is firmly connected with the end shield 5 by a suitable snap connection (not shown).

The stator coil 14 is a self-supporting drum winding (FIG. 4). It is wound on a winding support and receives its shape by a thermal treatment using self-bonding lacquer. The latter insulates the coil 14 and bonds the individual wires, thus ensuring the dimensional stability after the winding support has been removed. The principle of the arrangement of the phase windings is already disclosed in DE-OS 34 38 747 without the self-supporting shape of the stator coil 14 having been mentioned therein and without the electric connection of the ends of the stator coil shown therein being made in the fashion described herein above. The stator coil 14 has an inside radius $R_1$ at the first winding head 30 and an inside radius $R_2$ at the second winding head 31, where $R_1 < R_2$. In the area between the winding heads 30, 31, the phase windings 29 are arranged predominantly axially and in a circle with the radius $R_2$. Only in the area of the first winding head 30 does the circle formed by the phase windings decrease to the radius $R_1$. The outside radius $R_3$ of the first winding head 30 is smaller than the inside radius $R_2$ of the second winding head 31. The stator coil 14 has slot-shaped free spaces 32.

Figure 5:
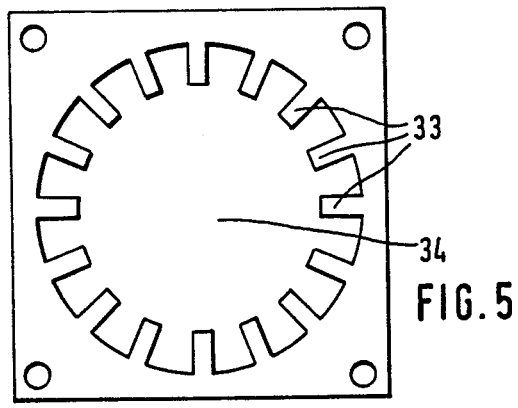
FIG. 5 is a front view of a lamination shape of the external magnetic yoke.

The external magnetic yoke 2 is constituted by a laminated-sheet plate. The lamination shape is shown in FIG. 5. It has a round cutout 34 with teeth 33.

The electronically commutated, collectorless direct-current motor in accordance with FIG. 1 is assembled by inserting the stator coil 14, with the plastic body 14 attached thereto adjacent the first winding head 30, into the laminated-sheet plate constituting the external magnetic yoke 2 so that the slot-shaped free spaces 32 of the stator coil 14 are filled by the teeth 33 of the laminated-sheet plate. The stator coil 14 is inserted into the laminated-sheet plate until it projects about an equal length from each side end of the laminated-sheet plate. The circuit board 17 is then soldered to the eyehooks 16 and the Hall-effect sensors 26. The end shield 5, which has a suitable device for fixing the circuit board 17, is then slipped on the stator 3 which is formed as above. The rotor 4 is inserted through the stator 3 on the bearing 8 of the end shield 5 and finally, the end shield 6 with the bearing 9 is placed on the rotor 4. In the assembled condition, the Hall-effect sensors 26 are then arranged a region adjacent the surface of the annular magnet 13.

We claim:

1. Electronically commutated, collectorless direct-current motor having a predetermined number of poles, comprising:
   a rotor having a multipolar body of permanent-magnet material;
   a multipolar stator coil surrounding said rotor, said stator coil having a plurality of electrical ends;
   an internal magnetic yoke surrounded by said multipolar stator coil; said stator coil having a plurality of phase windings equal in number to a multiple of said predetermined number of poles;
   a cylindrical body having a rim and a portion which is concentrically disposed within said stator coil;
   a plurality of eyehooks connected to a front portion of said rim of said cylindrical body; each of said plurality of electrical ends of said stator coil being respectively secured to said rim by corresponding ones of said plurality of eyehooks, said rim having a plurality of circumferential recesses which are equal to the number of said plurality of phase windings, each of said plurality of circumferential recesses containing a corresponding one of said eyehooks.

2. A direct-current motor as claimed in claim 1, wherein said cylindrical body and said rim are integral, said cylindrical body having a cylindrical interior opening, and further comprising spacing means extending from said rim between ones of said eyehooks, and wherein each of said eyehooks are U-shaped so as to have a short leg and a long leg, wherein said short leg extends from said rim a distance approximately equal to that of said spacing means, said long leg extending from said rim a distance beyond that of said spacing means.

3. A direct-current motor as claimed in claim 1, wherein said rim has a plurality of outer projections extending radially in the vicinity of each of said plurality of recesses.

4. A direct-current motor as claimed in claim 2, further comprising a circuit board connected to said stator, and wherein each said long leg of each of said eyehooks has an end, and each said end is soldered to said circuit board to electrically connect said electrical ends of said stator coil to said circuit board.

5. A direct-current motor as claimed in claim 4, further comprising at least one Hall-effect sensor disposed on said rim between two of said plurality of eyehooks, said at least one Hall-effect sensor being electrically connected to said circuit board.

6. A direct-current motor as claimed in claim 5, further comprising a frame, and wherein said circuit board is connected to said frame, and further comprising a plurality of connectors which are electrically connected to said circuit board.

7. A direct-current motor as claimed in claim 1, wherein said stator coil is a self-supporting drum winding, said cylindrical body is disposed in a first winding head of said stator coil, and said electrical ends of said stator coil are wound at least partly around said cylindrical body.

8. A direct-current motor as claimed in claim 7, wherein said stator coil has an inside radius $R_1$ at said first winding head and an inside radius $R_2$ at a second winding head, where $R_1 < R_2$, forming an area between said first and second winding heads, said plurality of phase windings being disposed axially and in a circle with said radius $R_2$, the radius of said stator coil decreasing only in the vicinity of said first winding head, an outside radius $R_3$ of said first winding head being smaller than said inside radius $R_2$ of said second winding head, and said stator coil having a plurality of slot-shaped free spaces between ones of said plurality of phase windings, so that said stator coil can be axially disposed into a correspondingly shaped external magnetic yoke.

9. An electrically commutated, collectorless direct-current motor comprising:
   a stator having a self-supporting drum winding with a winding head and a cylindrical plastic body, said cylindrical plastic body being mounted concentrically with said drum winding in said winding head and having a plurality of recesses disposed in spaced relationship about said cylindrical plastic body; said stator having a plurality of electrical ends;
   a plurality of U-shaped eyehooks, each of said plurality of U-shaped eyehooks being mounted in respective ones of said plurality of recesses, for receiving said electrical ends of said stator; and
   a circuit board electrically connected to said drum winding by electrical connection with ones of said plurality of U-shaped eyehooks.

10. An electronically commutated, collectorless direct-current motor having a predetermined number of poles, comprising:
   a rotor having a multipolar body of permanent magnetic material;
   a stator coil surrounding said rotor, said stator coil being surrounded by a number of phase windings equal to a multiple of said predetermined number of poles of said motor; said stator coil having a plurality of electrical ends;

a cylindrical plastic body having a front end, said front end having a rim which has a plurality of spaced recesses disposed on an end face of said rim of said plastic body, wherein said plurality of recesses equals the number of phase windings; and a plurality of eyehooks mounted in each of said plurality of recesses, each of said eyehooks receiving corresponding ones of said plurality of electrical ends for electrically connecting said electrical ends to the corresponding ones of said plurality of eyehooks.

* * * * *